(No Model.)
H. A. IDDINGS & J. P. MEGEATH.
TYPE WRITER SCALE.
No. 433,789. Patented Aug. 5, 1890.
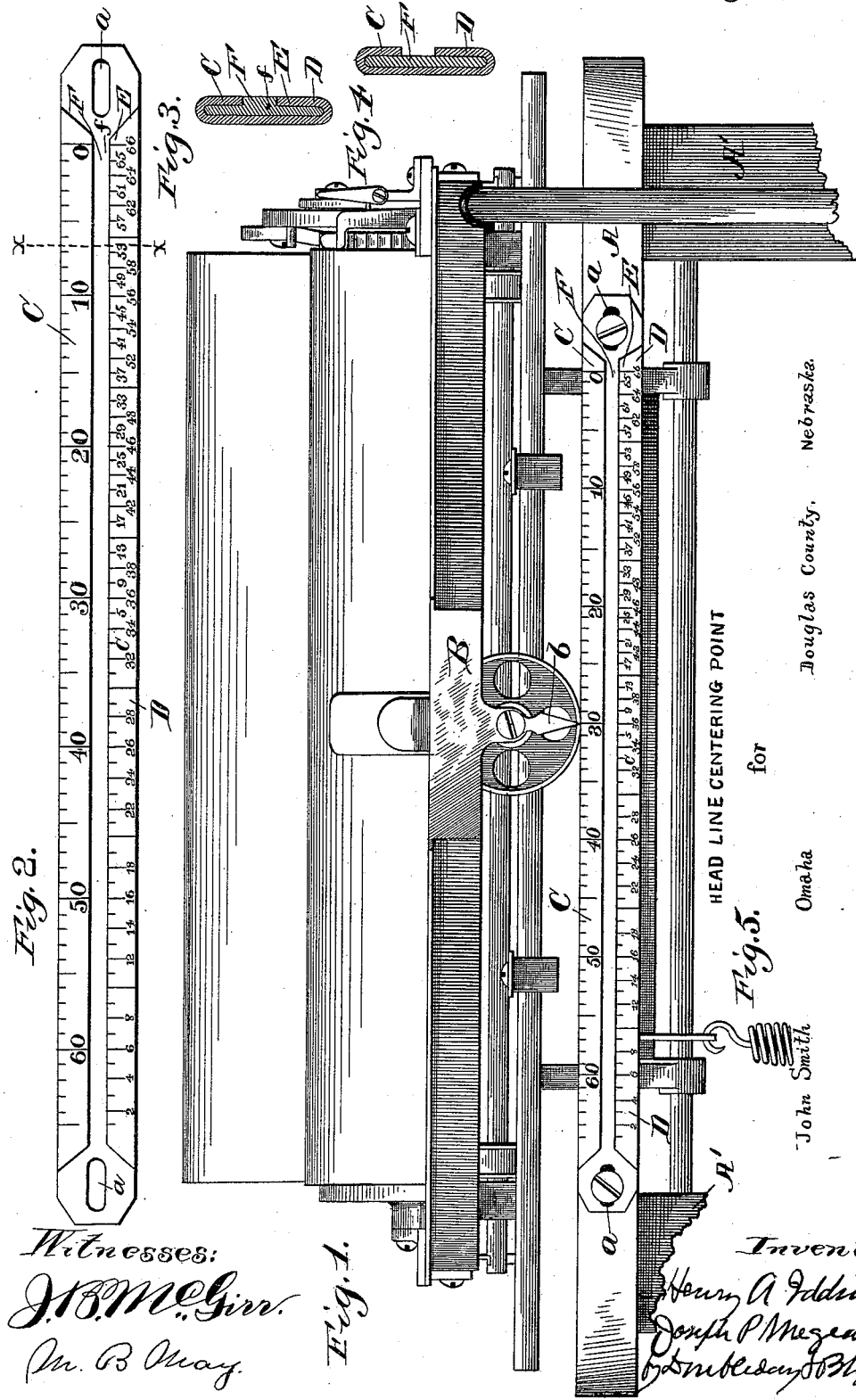

UNITED STATES PATENT OFFICE.

HENRY A. IDDINGS AND JOSEPH P. MEGEATH, OF OMAHA, NEBRASKA.

TYPE-WRITER SCALE.

SPECIFICATION forming part of Letters Patent No. 433,789, dated August 5, 1890.

Application filed July 13, 1888. Serial No. 279,842. (No model.)

*To all whom it may concern:*

Be it known that we, HENRY A. IDDINGS and JOSEPH P. MEGEATH, both of Omaha, in the county of Douglas and State of Nebraska, have invented a new and Improved Type-Writer Scale, of which the following is a specification, reference being had to the annexed drawings, forming a part thereof, in which—

Figure 1 is a front elevation of part of an ordinary type-writer having our invention applied thereto. Fig. 2 is an elevation of our improved scale enlarged. Fig. 3 is a section on line $x$ $x$, Fig. 2, further enlarged. Fig. 4 is a similar section slightly modified. Fig. 5 is a diagram illustrating the application of our invention.

Similar letters of reference indicate corresponding parts in all the views.

The object of our invention is to provide a scale for type-writers, which may be used as an ordinary scale, and which will also serve as a tabular scale and column-indicator, a head-line-centering scale, and a marginal-ending scale, or any one or more of such scales in combination, whereby an operator can accurately determine the point at which to commence printing under any desired arrangement of words without making a mental calculation based upon the ordinary scale.

Referring to the drawings, A indicates the bed-plate, and A' the supporting posts, of an ordinary type-writer—a Remington—our invention being particularly adapted for use upon such machines as they are usually constructed.

B represents the carriage provided with a pointer $b$, which travels in close proximity to the scale.

In carrying out our invention we prefer to make our scale from a single strip of metal having its edges turned over toward each other, but separated from each other a short distance, and provided at its ends with slots $a$ $a$, so that it can be adjustably attached to the bed-plate by ordinary screws, as indicated in Figs. 1 and 2. We propose to leave an open space between these turned-over edges or flanges and the body of the plate for the reception of a strip of paper or other material constituting an erasable surface adapted to receive marks from a lead-pencil or other suitable implement. The upper flange is graduated from 0 to 65, in the usual way, constituting a scale C, which in practice we prefer to call the "principal scale." The lower flange is provided with two rows of figures constituting scales D E. The lower scale extends the same distance across the machine as does the upper scale, and is graduated in the same manner so far as relates to the number of its divisions; but, commencing at the left hand and its alternate lines beginning with the second, extend about half the width of the flange up to the tenth, which extends entirely across the flange, and so on throughout its entire length. These alternate lines are numbered 2 4 6 8, the 10 being omitted, its position being indicated, however, by a long line. This system of numbering by the use of the even numbers, omitting the multiples of 10, is continued to the right-hand end of the scale, where it terminates with the figures 66. This scale we have marked D and call the "right-hand marginal-ending scale."

The head-line centering the scale E is formed upon the upper edge of the lower flange, commencing in the center at $c$ at one of the short lines, which is the initial line of this auxiliary scale, part of its lines being shorter than the others. Commencing with 1 at $c$ and continuing toward the right hand, the alternate short lines are numbered 5, 9, 13, and so on, increasing by four up to 65. This system of placing these numbers at the ends of the short lines facilitates their use by avoiding all liability of confusing them with the numbers of the scale D. Thus although this auxiliary scale is only one-half as long as the principal scale, its numbers extend from 1 up to 65, because of the fact that each of the space-lines, including both series of short lines and the long lines which extend clear across the flange, increase by a common difference of two for each space, although, for the sake of clearness, on the drawings the alternate numbers are omitted.

F represents an erasable surface arranged between the upper and lower scales, and we prefer to make it with a raised portion or rib $f$, projecting upward between the adjacent edges of the turned-over flanges, to facilitate erasing the figures by means of a rubber, such figures being ordinarily placed thereon for temporary use.

One method of using our invention is illustrated in Fig. 5. For instance, in the upper line of that figure (or diagram) are the words "Head-Line-Centering Point," containing twenty-two letters, with three spaces between the words, requiring a total of twenty-five strokes to print this line. By placing the pointer of the type-writer carriage over the figure 25 in scale E and writing a line it will be exactly in the center of the paper, and this rule will hold good for every case in which there is required an odd number of strokes for printing. For the word "for" in the next line below the pointer b should be placed above the point 3 of the same scale, there being an odd number of letters in that word. If the word or words desired to be printed require an even number of strokes, the pointer should be placed over the line of this scale E next above or below the number of strokes as will make the word look most nearly symmetrical, it being of course understood that if there be a period or other punctuation-mark at the end of the word or series of words such punctuation-mark should be counted in determining the number or strokes required.

In using the right-hand marginal-ending scale—as, for instance, in writing dates, signatures to letters, or other words which should terminate at the right-hand margin—the letters and spaces should be counted to determine the number of strokes. For instance, in printing those words "right-hand marginal-ending point" thirty-three strokes are required, there being twenty-eight letters, four spaces between the words, and one punctuation-mark at the end of the line. Now by placing the pointer b over the 33 point on that scale D the period will be printed on the line 66, that being the end of the line as this kind of a machine is ordinarily constructed.

As has been explained, line 66 marked on scale D corresponds to line 65 on scale C, and in the description herein given of the working of our invention it has been explained as though the machine would print no letters beyond that of the last line marked upon these scales, although many machines will print an additional letter, thus making sixty-seven upon a line.

The blank erasable surface F is a tabular scale and column-indicator. It may consist of any material susceptible of receiving the mark of a pencil or pen. By means of marks upon this portion of a scale made at such places as will coincide with the lines of the columns the operator can readily see where to commence or terminate the words or figures to be placed in said columns. The marks made upon this scale may be erased at pleasure and new ones placed thereon when desired. The class of work on which this scale can be used to great advantage is statistical tablets, invoices, quotations, estimates, references, statements, and any and all work required to be done in columns.

From the above it will be readily understood that by the use of the scales D E F, in combination with the ordinary type-writer scale C, the operator can readily determine the points at which the first strokes of any words or series of words shall be commenced in order to secure a symmetrical arrangement of the printed matter upon the page and without making any mental calculation, it being only necessary to count the number of letters, letters and spaces between words, or letters, spaces, and punctuation-marks, as the case may be, and can also instantly move the platen and work to the right point for reprinting any particular letter or figure should he desire to do so for correcting an error or otherwise.

When printing matter in several perpendicular columns, it will sometimes be desirable to indicate the first letter or stroke of each column, commencing at the left hand, and by the figure 1 for the first column, 2 for the second column, 3 for the third column, and so on across the page, particularly when the work is of such character that some of the horizontal lines will not contain an entry for each and every of the perpendicular columns.

By mounting the scales D E F upon the stationary part of the machine, so that the pointer traverses them as well as the ordinary scale C, many advantages are attained over a construction in which the reverse order of arrangement should be employed, because, among other things, such scales can be readily applied to the ordinary type-writers which carry traveling pointers, and are so constructed that our improved scale can be readily substituted for those scales now upon the machine.

We are aware that auxiliary scales, in combination with a traveling carriage and a stationary pointer or other indicator, have been used upon type-writers or other writing-machines, and hence do not claim such invention broadly; but we believe ourselves to be the first to combine with a type-writer carriage having a traveling pointer an auxiliary scale numbered from left to right and attached to the stationary part of the machine for indicating the point at which the first stroke of a word or sentence must be made in order that the last stroke shall be made at the marginal ending of the line. We also believe ourselves to be the first to employ an auxiliary scale in which the numbering commences at or near the center of the line and extends toward the end of the line, whereby the operator can determine the point at which the first stroke must be made for centering the word or sentence upon the page.

It is our intention to make these scales of such lengths and widths as will best adapt them to be used on the different kinds of writing-machines for which they are adapted;

but for the purpose of illustration we have made use of a scale such as is ordinarily used on a No. 2 Remington type-writer, and which is provided with sixty-six lines or points, which, as is the custom upon that kind of machines, are marked from 0 to 65.

What we claim is—

1. A type-writer scale-plate provided with the principal scale marked thereon, an auxiliary scale extending alongside the initial half of the principal scale, but numbered commencing at the central line of the principal scale, which is the initial line of the auxiliary scale, such line being numbered on the auxiliary scale 1, and succeeding space-divisions being marked with numerals which increase by a common difference of two for each space.

2. A type-writer scale-plate provided with the principal scale marked thereon, an auxiliary scale extending alongside the initial half of the principal scale having its spaces corresponding with the spaces of the adjacent half of the principal scale, but numbered commencing at the central line of the principal scale, which is the initial line of the auxiliary scale, such line being numbered on the auxiliary scale 1, and succeeding space-divisions being marked with numerals which increase by a common difference of two for each space, and an erasable surface extending lengthwise of the auxiliary scale.

3. A type-writer scale-plate provided with the principal scale marked thereon and with an auxiliary scale extending alongside the initial half of the principal scale, but numbered commencing at the central line of the principal scale, which is the initial line of the auxiliary scale, substantially as set forth.

4. A type-writer scale-plate the edges of upper and lower bent-over portions being straight, attached to the frame of the machine, provided with the principal scale marked thereon numbered from right to left, and provided also with an erasable surface extending alongside the principal scale, in combination with a pointer attached to a traveling carriage, substantially as set forth.

5. A type-writer scale-plate provided with the principal scale marked thereon and auxiliary scale extending alongside the initial half of the principal scale, but numbered commencing at the central line of the principal scale, and an erasable surface extending lengthwise of the auxiliary scale, substantially as set forth.

6. A type-writer scale-plate provided with a scale commencing at or near the center line of the machine, such line being numbered 1, and succeeding space-divisions being marked with numerals which increase by a common difference of two for each space, substantially as set forth.

7. A type-writer scale-plate provided with a scale commencing at or near the center line of the machine, such line being numbered 1, and succeding space-divisions being marked with numerals which increase by a common difference of two for each space, and provided also with an erasable surface extending lengthwise of said numbered scale, substantially as set forth.

8. A type-writer scale-plate provided with a scale commencing at or near the center line of the machine, such line being numbered 1, and succeeding space-divisions being marked with numerals which increase by a common difference of two for each space, and provided also with a marginal-ending scale extending the entire width of the machine and numbered, commencing at the left-hand end and continued to the right-hand end, in combination with the traveling pointer, substantially as set forth.

9. In a type-writer, the combination, with the stationary frame and a traveling carriage adapted to move alternately in opposite directions, of a marginal-ending scale numbered progressively from left to right and attached to the stationary frame, and a pointer attached to and moving with the carriage, substantially as set forth.

10. A scale for a type-writer formed of a plate having its opposite edges bent over toward each other, with a space between their adjacent edges and graduated upon their bent-over edges, combined with an erasable surface arranged between the bent-over edges, substantially as set forth.

11. A type-writer scale-plate attached to the frame of the machine, provided with the principal scale marked thereon, numbered from right to left, and an auxiliary scale extending alongside the initial half of the principal scale, but numbered commencing at the central line of the principal scale, and an auxiliary marginal-ending scale extending the entire length of the principal scale and numbered from left to right in reverse order thereto, and an erasable surface extending lengthwise of the auxiliary scale, in combination with a pointer attached to a traveling carriage, substantially as set forth.

12. A type-writer scale-plate provided with the principal scale marked thereon, and an auxiliary scale extending alongside, parallel to and of equal length with the principal scale, having its spaces correspond with the spaces of the principal scale, but numbered from left to right, substantially as set forth.

13. A type-writer scale-plate provided with the principal scale marked thereon, and an auxiliary scale extending alongside parallel to and of equal length with the principal scale, having its spaces correspond with the spaces of the principal scale, but numbered from left to right, and an erasable surface extending lengthwise of the auxiliary scale, substantially as set forth.

14. A type-writer scale-plate provided with a scale commencing at or near the center line of the machine, such line being numbered 1, and succeeding space-divisions being marked with numerals which increase by a common difference of two for each space, and provided also with a marginal-ending scale extending the entire length of the plate and numbered commencing at the left hand end and continued to the right-hand end, and an erasable surface extending lengthwise from end to end of the marginal-ending scale, in combination with the traveling pointer, substantially as set forth.

15. In a type-writer, the combination, with the stationary frame and a traveling carriage, of a marginal-ending scale numbered progressively from left to right, and an erasable surface extending lengthwise from end to end of said marginal-ending scale, which said scale is attached to the stationary frame, with a pointer attached to and moving with the carriage, substantially as set forth.

16. A type-writer scale-plate provided with the principal scale marked thereon and with an auxiliary scale extending alongside the initial half of the principal scale, but numbered commencing at the central line of the principal scale, which is the initial line of the auxiliary scale, and with an auxiliary scale extending alongside and from end to end of the principal scale, but numbered from left to right, substantially as set forth.

HENRY A. IDDINGS.
JOSEPH P. MEGEATH.

Witnesses:
T. A. MEGEATH,
W. S. STUTSMAN.